Sept. 24, 1935. J. R. GAMMETER 2,015,648
METHOD AND APPARATUS FOR MAKING DIPPED RUBBER ARTICLES
Filed July 11, 1931 4 Sheets-Sheet 1

INVENTOR
JOHN R. GAMMETER
BY
ATTORNEYS

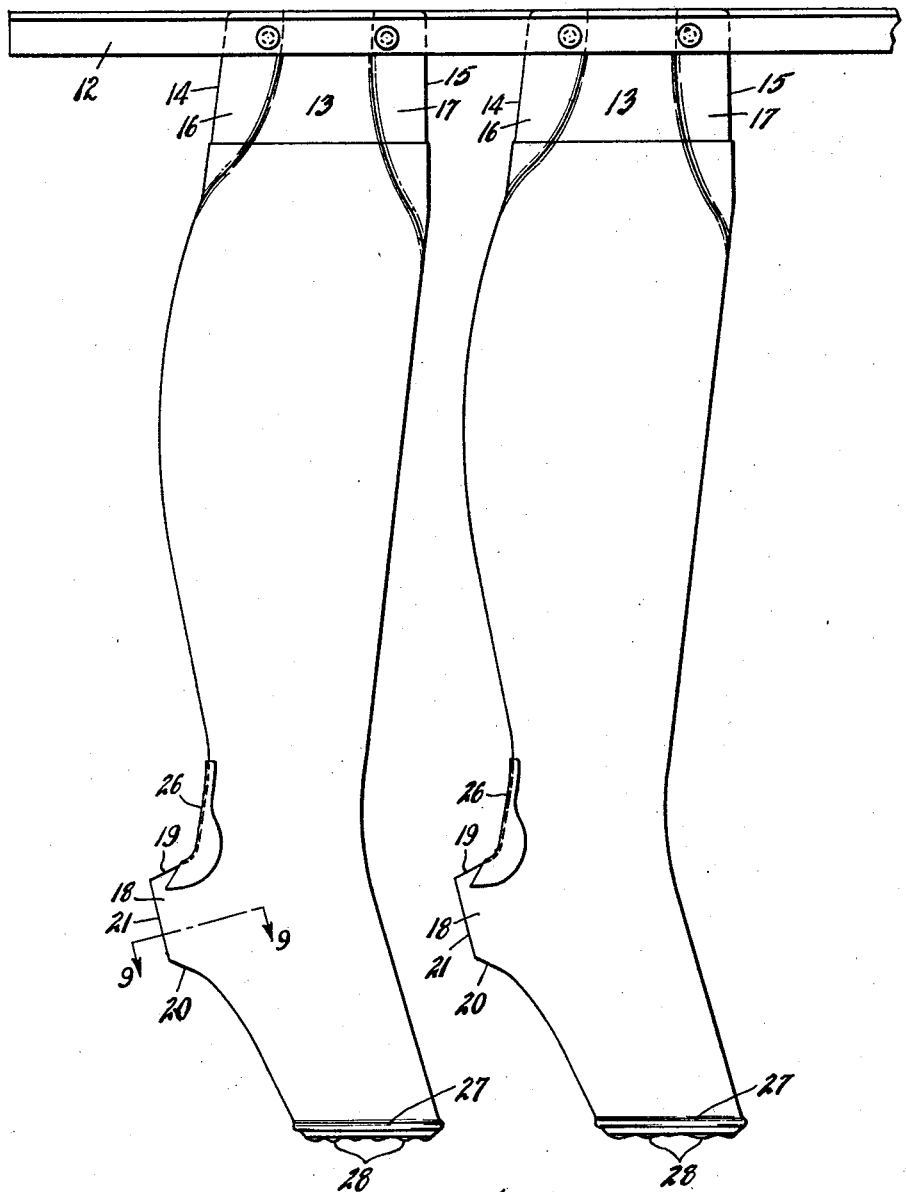

Sept. 24, 1935.   J. R. GAMMETER   2,015,648
METHOD AND APPARATUS FOR MAKING DIPPED RUBBER ARTICLES
Filed July 11, 1931   4 Sheets-Sheet 3
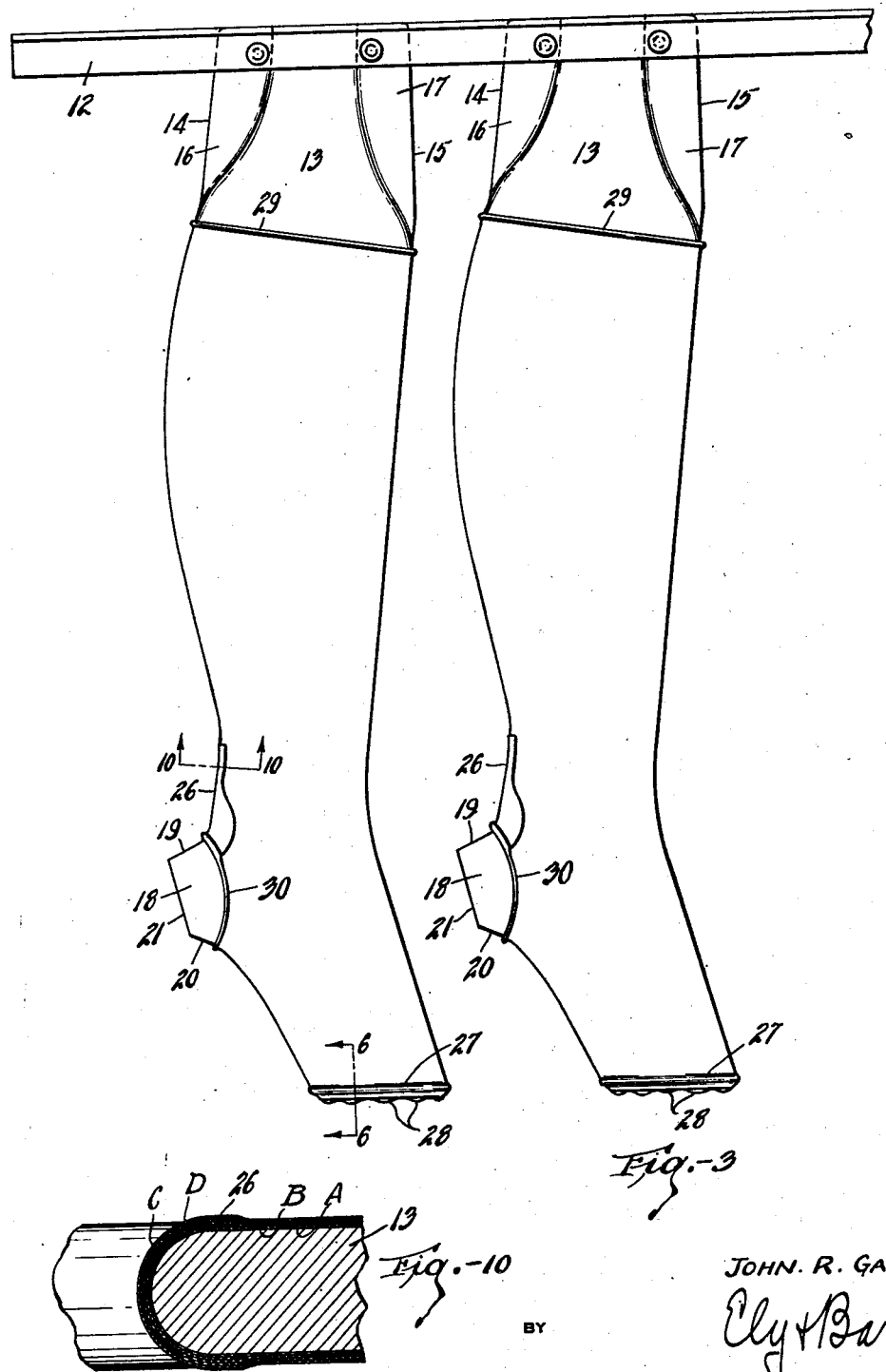
INVENTOR
JOHN. R. GAMMETER
BY Ely H Barrow
ATTORNEYS Sept. 24, 1935. J. R. GAMMETER 2,015,648
METHOD AND APPARATUS FOR MAKING DIPPED RUBBER ARTICLES
Filed July 11, 1931 4 Sheets-Sheet 4
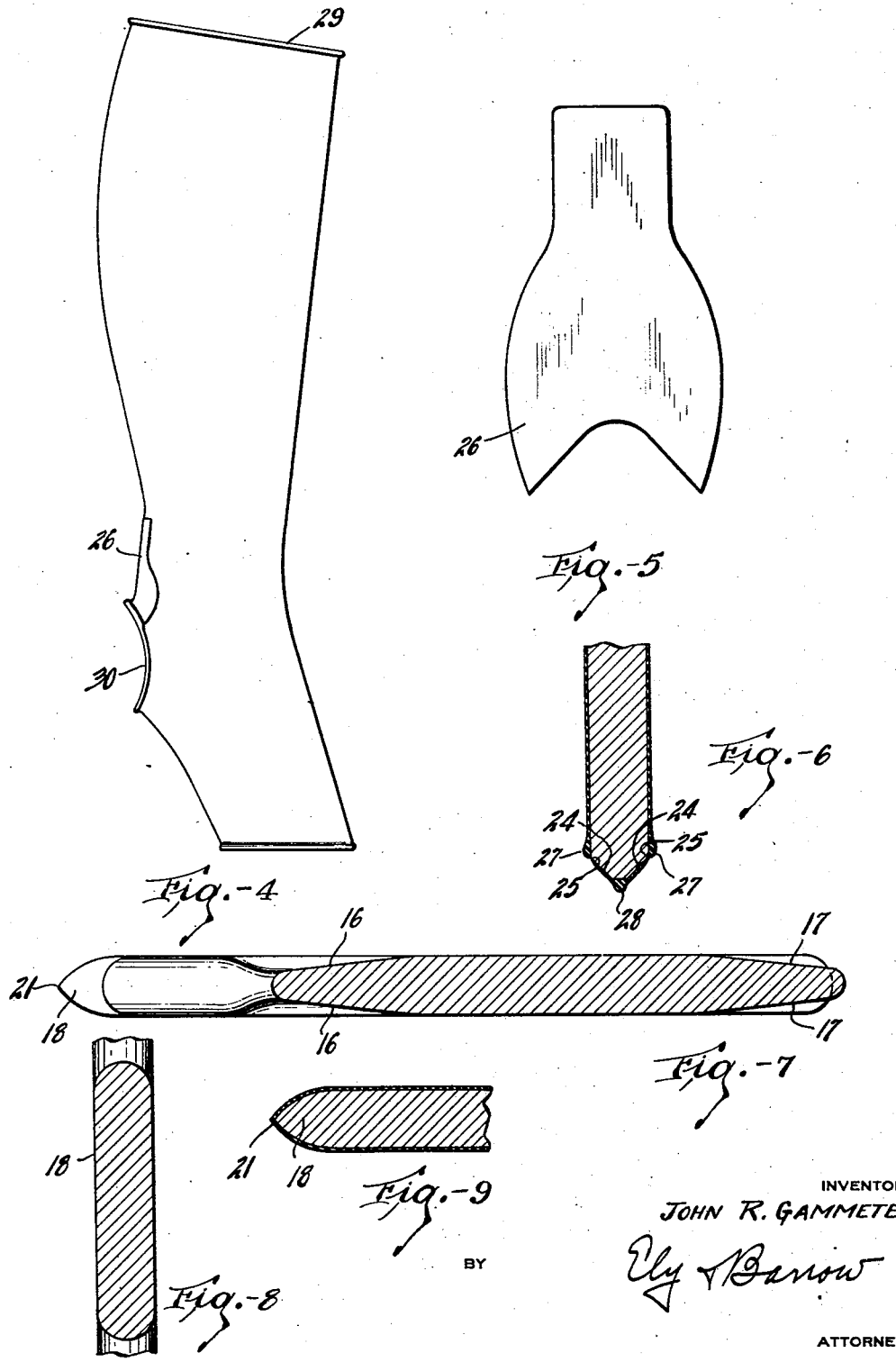
INVENTOR
JOHN R. GAMMETER
BY
ATTORNEYS Patented Sept. 24, 1935

2,015,648

UNITED STATES PATENT OFFICE 2,015,648

METHOD AND APPARATUS FOR MAKING DIPPED RUBBER ARTICLES

John R. Gammeter, Akron, Ohio, assignor to International Latex Corporation, Rochester, N. Y., a corporation of New York Application July 11, 1931, Serial No. 550,165

21 Claims. (Cl. 18—41)

This invention relates to dipped rubber articles and to procedure and equipment for making the same.

One purpose of the invention is to provide an improved dipped rubber article such as a protector.

Another purpose of the invention is to provide an economical and effective method for making dipped rubber goods with a reinforced opening therein.

Another purpose of the invention is to provide a simple, inexpensive and practical process for applying a reinforcing or like patch on dipped rubber goods.

Another purpose of the invention is to provide a bead or reinforcement upon a dipped rubber article in the operation of dipping the form on which the rubber forming the article is deposited to dispense with a bead rolling or taping operation such as heretofore required.

A further purpose of the invention is to provide a form shaped to facilitate forming a reinforced opening in a dipped rubber article.

A further purpose of the invention is to provide a form to carry out in an effective manner the process of forming a bead or reinforcement upon a dipped rubber article during the dipping operation.

The foregoing and other purposes of the invention are attained by the method and equipment illustrated in the accompanying drawings and described below. It is to be understood that the invention is not limited to the particular form thereof shown and described.

Of the accompanying drawings:

Figure 2 is an elevation of the form rack as removed from the dipping tank after one or more dipping operations with an intermediate drying operation and showing a reinforcing patch applied to the deposited rubber on the form;

Figure 3 is a view similar to Figure 2 showing the forms after one or more additional dipping and drying operations have been performed subsequent to the application of the patch and showing beads rolled at the top and heel opening of the stocking protector;

Figure 4 is an elevation of the stocking protector embodying the invention;

Figure 5 is a plan of the patch to be applied to the stocking protector in accordance with the invention;

Figure 6 is a section on line 6—6 of Figure 3;

Figure 7 is a section as on line 7—7 of Figure 1;

Figure 8 is a section on line 8—8 of Figure 1;

Figure 9 is a section on line 9—9 of Figure 2; and

Figure 10 is an enlarged section on line 10—10 of Figure 3.

Figure 1:
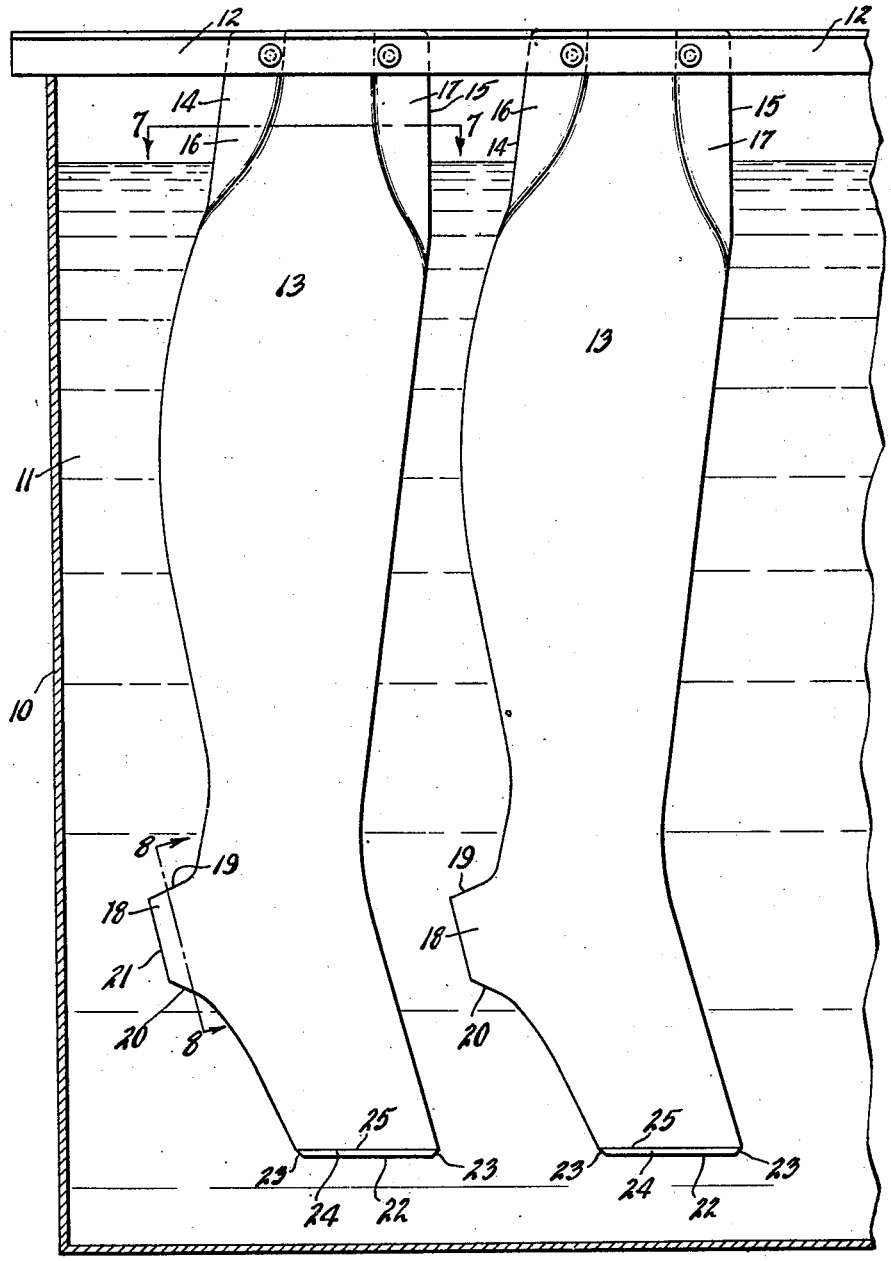
Figure 1 is a section through a portion of a dipping tank in which dipping forms embodying the invention are illustrated as being dipped, whereby a film of rubber will be applied thereto.

Referring to the drawings, the numeral 10 designates a dipping tank containing a body of liquid rubber such as latex 11, which may contain the usual vulcanizing ingredients, accelerators, etc. and pigments to produce goods of the desired color. A rack 12 has forms 13, 13 secured thereon, the particular forms shown being designed for making the improved stocking protector.

The forms 13 are generally of flat plate-like formation with rounded edges and are generally of the profile of the desired shape for making a stocking protector. (See Figure 8.) At the top of the forms as shown in Figures 1 and 7, the forms are tapered upwardly as at 14 and 15 and also toward the opposite edges as at 16, 16 and 17, 17 whereby upon rolling the rubber upon itself downwardly upon the forms to make beads at the tops of the stocking protector, the material rolled into the bead will be stretched or tensioned to facilitate the formation of a compact bead.

At the heels of the forms the forms are provided with an outward extension 18 with tapered edges 19 and 20 and tapered to a comparatively abrupt edge at 21. (See Figure 9.) This extension provides surfaces for the deposit of rubber which may be rolled upon itself inwardly from edge 20 of the extension to form an aperture with a beaded edge at the heel of the stocking protector, the tapering of the extension as shown serving to stretch the bead as it is rolled to assist in compacting the same.

At the bottoms or toes of the forms, the forms are provided with a transverse edge 22 so designed that during the dipping operation, a heavy deposit of rubber collects at the edges of the toe to provide a reinforcement whereby when the rubber on the bottom of the toe portion is removed the resulting stocking protector will have toe openings with reinforced edges. For this purpose (see Figures 1 and 6) the toe ends 22 of the forms are beveled or tapered downwardly as at 23, 23 and 24, 24 from a continuous abrupt edge 25. In order words, the surfaces 23, 23 and 24, 24 extend from the free edge 25 toward the principal axis of the form. This edge is relatively sharp being defined by the junction of the tapered surfaces 23, 23 and 24, 24 with the adjacent surfaces of the main portion of the form 13, at an external angle or angles herein illustrated as substantially greater than 180 degrees. It will be understood that the sharpness of the edge 25, or in other words, the angular relation between each tapered surface and the adjoining surface of the body of the form is determined by the workable concentrations and viscosities of the liquid rubber used in the making of the deposited article and also by the number of dippings to which the form is subjected in making the articles, as well as by the speed of dipping the form. It will also be understood that the edge 25 should be sufficiently sharp or abrupt so that the rubber will accumulate as a ridge at one side of the edge instead of flowing over the edge as a layer of uniform thickness with the remainder of the article.

In carrying out the invention, the forms 10 are preferably first heated as by dipping the same in boiling water to promote rapid setting of the deposited rubber thereon. The forms while still hot are dipped into the latex 11 one or more times with intermediate dryings as by exposing the forms to the action of hot air passed over the forms. The forms are preferably withdrawn slowly from the latex preferably at a speed such that the latex "sets" on the forms as the forms are withdrawn without substantial downward flow or drainage of the latex.

If the improved stocking protector is to be provided with a reinforcing patch at the heel as indicated at 26, this may be and preferably is applied to the forms between dips so that it becomes enclosed in the deposited rubber. For example, it is preferred to provide a stocking protector by four dippings and to apply the patch 26 between the second and third dipping. This is disclosed in Figure 10, the first dipping being marked A, the second B, the third C, and the fourth D. It is to be understood, however, that the laminations indicated in the drawings are not apparent in the deposited rubber stocking protector. The patches 26 are preferably made from films of latex deposited upon a smooth plate such as a glass plate and cut or stamped to the required shape and applied to the stocking protector while not thoroughly dry. Patches of chamois, fabric, or other suitable material may be employed.

During the dipping operations the deposited rubber collects as at 27, 27 above edges 25 (Figures 3 and 6) to form the toe reinforcement. On the beveled portions 23 and 24 of the form the rubber deposits quite thinly beneath edges 25 and it collects more heavily at 28.

After the dipping and drying operations and before the latex has thoroughly dried, the beads 29 are rolled downwardly upon the forms at the tops (see Figure 3) in the usual manner either by hand or by suitable bead rolling apparatus and the beads 30 at the heels of the stocking protectors are rolled inwardly of the extensions 18. The latter operation is best accomplished by first slitting the rubber at the edges 21 of the extensions which may be accomplished by applying a heated iron similar to a soldering iron or other suitable heated element along the edges 21. The beads 30 may be rolled at the heels by hand and also by suitable bead rolling mechanism. The patch 26 is preferably so applied to the stocking protector that the lower portion thereof will be rolled into the heel bead whereby it is securely anchored in the stocking protector and whereby there will be no weak place in the protector between the patch and bead which might tear easily in drawing the stocking protector over the foot.

The stocking protectors, after the bead rolling operations are subjected to vulcanization which may be accomplished either by dipping the forms in a heated liquid or by subjecting the forms to the action of steam.

Subsequent to vulcanization, the stocking protectors are stripped from the forms and the selvage below the reinforcement 27 is torn or cut from the goods.

It will be obvious that the several features of the invention are not limited in application to stocking protectors generally, since the provision of forms tapered at the top or along the extension for the purpose stated is highly desirable in making other articles. Other articles also may require an opening with a reinforced edge such as the heel opening in the stocking protectors, or an opening such as the toe opening thereof. Other deposited rubber articles may also require a patch located therein.

Modifications of the invention may be resorted to without departing from the spirit thereof or the scope of the appended claims.

What is claimed is:

1. A form for making rubber stocking protectors by dipping, said form comprising a flat plate of the desired profile formed with rounded edges, the top of the form tapering whereby rolling of the rubber downwardly of the form to make a bead at the top of the stocking protector will set up a tension in the bead serving to compact it, said form having an extension therefrom at the heel, the outer end of the extension being sharp and the extension tapering whereby the rubber deposited upon the extension may be easily slit at the sharp end thereof and the rubber rolled upon itself inwardly of the extension under tension to form a reinforced opening at the heel of the stocking protector, said form having a lower toe end provided with a comparatively sharp edge and beveled inwardly from said edge, whereby during the dipping operations the rubber will collect above said edge to form a reinforcement for a toe opening in the stocking protector, the rubber deposited on the end of the form below said edge being adapted to be separated from the stocking protector adjacent said reinforcement to form the toe opening.

2. A form for making a deposited rubber article with an opening through the body thereof, said form having an extension beyond the point where the opening is desired, whereby the rubber may be separated on the extension and rolled upon itself inwardly of the extension to form a bead about the opening, said extension having a sharp outer end against which a heated element may be placed to slit the rubber on the extension.

3. A form for making a deposited rubber article with an opening through the body thereof, said form having an extension at the point where the opening is desired, whereby the rubber may be separated on the extension and rolled upon itself inwardly of the extension to form a bead about the opening, said extension tapering whereby when the bead is rolled inwardly thereof it will be tensioned and thereby compacted.

4. A form for making deposited rubber articles, said form having a lower end formed with an abrupt edge formed by the juncture of two intersecting surfaces whereby the deposited rubber will collect during the depositing process just above said edge to form a reinforcement.

5. A form for making deposited rubber articles, said form having a lower end formed with an abrupt edge formed by the juncture of two surfaces whereby the deposited rubber will collect during the depositing process just above said edge to form a reinforcement, the lower end of the form being beveled from said edge whereby the rubber deposited on the lower end of the form beneath said abrupt edge will gather or collect away from said abrupt edge, leaving a comparatively thin deposit immediately below said abrupt edge adapted to be easily divided from the heavier deposit above to leave a reinforced opening in said article.

6. That method for making deposited rubber articles with an opening through the body thereof which comprises providing a form with an extension at the point where the opening is desired, depositing rubber upon the form including the extension, slitting the rubber on the extension, and rolling the rubber upon itself inwardly of the extension.

7. That method for making deposited rubber articles with an opening through the body thereof which comprises providing a form with an extension having a sharp end at the point where the opening is desired, depositing rubber upon the form including the extension, slitting the rubber on the extension by applying a heated element to said sharp end, and rolling the rubber upon itself inwardly of the extension.

8. That method of making deposited rubber articles which comprises providing a form with an abrupt, obtuse lower edge, depositing rubber upon said form whereby the rubber will collect and form a heavy portion just above said edge, and removing the rubber from said articles immediately beneath said heavy portion to leave an article with a reinforced opening.

9. That method of making deposited rubber articles which comprises providing a form with an abrupt lower edge and depositing rubber on the form whereby it will collect immediately above said edge to form a reinforcement.

10. That method for making stocking protectors which comprises providing a form with a tapered upper portion, a tapered extension at the heel, the outer end of which is abrupt and a comparatively abrupt lower edge at the toe, depositing one or more layers of rubber upon said form, applying a patch of rubber to said form at the heel thereof adjacent the extension, depositing one or more layers of rubber on the form after application of said patch, rolling a bead down the tapered upper portion of the form whereby the bead will be tensioned and compacting, slitting the rubber at the abrupt edge of the extension by applying a heated element thereto, rolling the rubber upon itself from the slit inwardly of the extension to form a bead which is tensioned and compacted by said tapered formation of the extension, a portion of said patch being rolled into the bead, vulcanizing the stocking protector, and removing from beneath the heavy deposit of rubber at the toe which formed above said abrupt lower edge, the rubber which was deposited on the lower end of the form.

11. A form for making deposited rubber articles with thickened edges, said form having an abrupt edge flush with the surface thereof, said edge being developed by the intersection of planes defining the main surface of the form whereby the rubber may accumulate on the main surface of the form at one side of said abrupt edge.

12. A form for making deposited rubber articles with thickened edges, said form having the shape of a geometric solid and having an abrupt edge extending around said form flush with the surface thereof, said edge being developed by the intersection of planes defining the main surface of said form whereby the rubber may accumulate on the main surface of the form at one side of said abrupt edge.

13. A form for making deposited rubber articles, said form having an abrupt edge, said edge being defined by the junction of portions of the outer surfaces of said form at an external angle or angles substantially greater than 180 degrees with the result that the lower end of the form recedes away from said edge whereby the rubber deposited above said abrupt edge will accumulate as a thickened deposit and will leave a comparatively thin deposit immediately below said edge adapted to be parted from the heavier deposit above the same to leave a reinforced opening in said article.

14. The method of making deposited rubber articles having certain reinforced margins which comprises providing a form having an abrupt edge at its surface, applying a coating of rubber on the form, holding the same in such draining position whereby the rubber will collect at one side of said edge and will tend to form a weakened region in the coating adjacent said edge, and separating the coating at the weakened region.

15. The method of making deposited rubber articles which comprises providing a form having thereon an abrupt edge defined by the intersection of two portions of the surface of said form, one of said surfaces extending from said edge toward an axis of the form, depositing rubber upon said form whereby the rubber will collect and develop a thickened portion at one side of said edge, and tearing the excess rubber from said article adjacent said edge to leave an article with an opening therein, the margin of which opening is reinforced.

16. The method of making hollow deposited rubber articles which comprises providing a form in the shape of a geometric solid, said form having at its surface an abrupt edge defined by the intersection of portions of the surface of said form, depositing rubber upon said form whereby the rubber will collect and develop a thickened portion at one side of said edge, and tearing the excess rubber from said article adjacent said edge to leave an article with an opening therein, the rubber at a margin of which opening being reinforced.

17. The method of making deposited rubber articles which comprises providing a form with an abrupt edge defined by the intersection of surfaces of the form, the portions of the surface of the form at one side of said edge overhanging the remainder of the surface of the form at the other side of said edge, while the coating is being deposited on the form, applying a coating of rubber upon said form and holding the form in such position whereby the rubber will collect and develop a thickened portion adjacent said edge, and parting the rubber adjacent the thickened portion to leave an article with a reinforced edge.

18. The method of making a hollow deposited rubber article, which comprises providing a form having thereon an abrupt continuous edge defined by the intersection of portions of the surface thereof, certain of said surface portions extending from said edge toward an axis of the form, applying a coating of rubber on said form, holding the form in such position whereby the rubber will collect and develop in said coating a thickened reinforcing ridge adjacent said edge, and tearing the rubber coating adjacent said ridge to provide an article with an opening therein having a reinforced margin.

19. The method of depositing rubber articles, which comprises providing a form with an abrupt edge, applying a coating of rubber upon said form, holding the form in such draining position whereby the rubber will collect and form a thickened portion at said edge, and tearing the rubber adjacent said thickened portion to leave an article with a reinforced edge.

20. The method of making a dipped rubber article having a reinforced margin which comprises dipping a form provided with an abrupt edge at its surface into an aqueous dispersion of rubber to coat the form therewith, withdrawing the form from the rubber dispersion in a direction so that the rubber dispersion tends to drain toward and collect above said edge to form a reinforcement, setting the coating and removing the coating from the form.

21. The method of making a dipped rubber article having a reinforced margin which comprises dipping a form provided with an abrupt edge at its surface into an aqueous dispersion of rubber to coat the form therewith, withdrawing the form from the rubber dispersion in a direction so that the rubber dispersion tends to drain toward and collect above said edge to form a reinforcement and tends to form a weakened region in the coating at said edge, setting the coating, removing the coating from the form and tearing the coating at the weakened region subsequent to the setting of the coating.

JOHN R. GAMMETER.